United States Patent
Bender et al.

(10) Patent No.: US 6,212,285 B1
(45) Date of Patent: *Apr. 3, 2001

(54) METHOD AND APPARATUS FOR MULTI-BIT ZONED DATA HIDING IN PRINTED IMAGES

(75) Inventors: Walter Bender, Auburndale; Daniel Gruhl, Cambridge, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/060,641

(22) Filed: Apr. 15, 1998

(51) Int. Cl.[7] .................................................. G06K 9/00
(52) U.S. Cl. ............................................. 382/100; 380/54
(58) Field of Search ................................. 380/18, 46, 54, 380/55; 382/100, 232; 283/72, 73; 713/176

(56) References Cited

U.S. PATENT DOCUMENTS

| | | | |
|---|---|---|---|
| 4,247,318 | * 1/1981 | Lee et al. | 156/163 |
| 5,689,587 | * 11/1997 | Bender et al. | 382/232 |
| 5,713,775 | 2/1998 | Geis et al. | 445/35 |
| 5,829,895 | * 11/1998 | Hayashi et al. | 400/124.05 |
| 5,960,081 | * 9/1999 | Vynne et al. | 380/10 |

FOREIGN PATENT DOCUMENTS

| | | | |
|---|---|---|---|
| 95/14289 | * 5/1995 | (WO) | G06K/19/14 |
| WO96/36163 | 11/1996 | (WO) | H04N/1/32 |

OTHER PUBLICATIONS

Bender et al., Techniques for data hiding, Feb. 1995, pp. 164–173, SPIE vol. 2420.*
Anatol Z. Tirkel et al., Scientific Technology, "*Image Watermaking—A Spread Spectrum Application*", no publication date.
Walter Bender et al., Proceedings of the SPIE, "*Techniques for Data Hiding*", 1995.
Maxwell T. Sanford II et al., "*The Data Embedding Method*", 1995.
David L. Hecht, Electronics and Imaging Laboratory, "*Embedded Data Glyph Technology for Hardcopy Digital Documents*", vol. 2171, pp. 341–352, 1994.

* cited by examiner

Primary Examiner—Amelia Au
Assistant Examiner—Timothy M. Johnson
(74) Attorney, Agent, or Firm—Testa, Hurwitz & Thibeault, LLP

(57) ABSTRACT

A technique for embedding a tracking number as a series of bits in a printed image alters characteristic parameter values at a set of pseudo-random locations chosen for each bit in an embedding zone. The alteration markedly changes the expectation value of some linear combination of mathematical functions of the values at that set of locations. A marker bit encoded to a higher certainty than other bits in the string aids in orienting the zones in decoding. The tracking number is detected and identified by exploiting the behavior of sums of a large number of random variables, based on the Patchtrack approach.

18 Claims, 5 Drawing Sheets

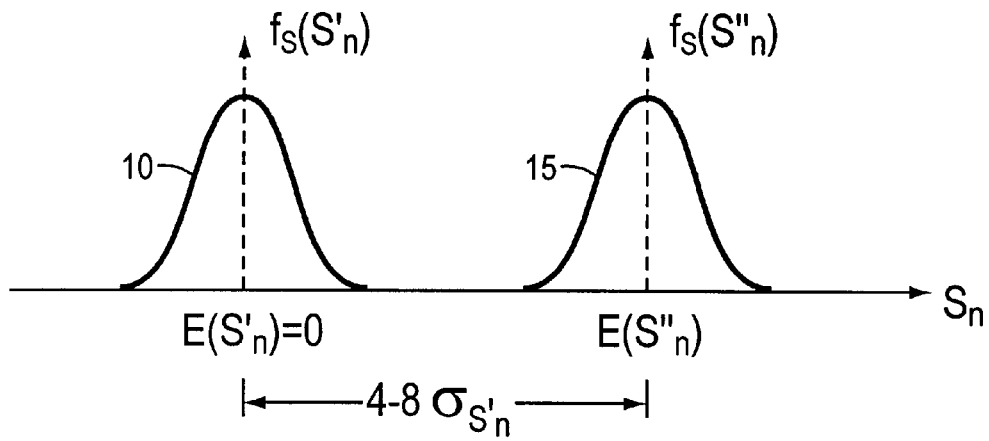
FIG. 1
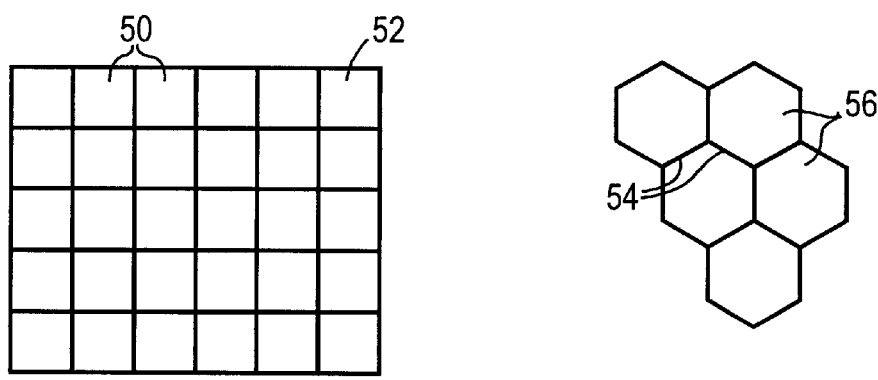
FIG. 2A
FIG. 2B
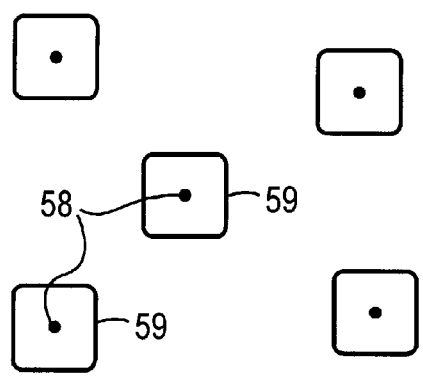
FIG. 2C

METHOD AND APPARATUS FOR MULTI-BIT ZONED DATA HIDING IN PRINTED IMAGES

FIELD OF THE INVENTION

This invention relates to steganography. More particularly, this invention relates to techniques for embedding a tracking number in a still image in a manner executable by a printing system.

BACKGROUND OF THE INVENTION

The appearance of commercial color photocopiers in the 1970's presented counterfeiters around the world with a powerful, widely accessible tool for creating passable reproductions of currency and other security documents such as treasury bills and airline tickets.

The proliferation in recent years of inexpensive color scanning and printing technology for personal computers has presented treasury departments with a new challenge with respect to currency counterfeiting. For example, an inexpensive system including a 720×720 color ink-jet printer with a 300 DPI flatbed scanner can be used to create color reproductions that exceed the quality of color photocopiers costing more than a hundred times as much.

This development has brought about a need for embedding a serial number, on the order of 32 bits, in an image printed by a printing system including an ink-jet printer in a manner that does not adversely affect image quality. At the same time, the encoding should not require extensive or expensive computational resources, since the goal would be ultimately to integrate the encoder into the printer itself. Also, for analysis, the bits should be detectable after digitizing by a flatbed scanner of typical consumer resolution, currently 600 DPI or less.

Enabling such an ink-jet printer to encode its serial number or some other identifying bit string onto its printed output differs fundamentally from the analogous problem for a photocopier. The dithering algorithm is not integral to the printer but is handled by software on a host computer or a plug-in card. An ink-jet printer handles data for only a small number of lines, corresponding to one or two passes of the printing head, at one time. A consumer ink-jet typically prints a quarter-inch BAND across an 8.5-inch path length in a single pass. Ideally, any technique should require image data from only one pass at a time.

Decoding the embedded serial number may be complicated by the nonlinear modifications introduced into the document by the print/scan sequence. Ink-jet printing subjects the document to be reproduced to nonlinear modifications not necessarily introduced by photocopying; these modifications take the form of spatial resolution lost to dithering in order to enhance the color depth obtainable from the four to seven colors of ink in its palette. If this output is then scanned, to examine the document for an encoded serial number for example, the creation of its RGB representation introduces further modifications. Scanning also typically introduces some translation and rotation of the image.

In terms of data hiding, this situation differs from the traditional information hiding problems. Typically for images, data hiding techniques are designed with the understanding that the quality of a test image might be largely degraded compared to the original unaltered host image in terms of signal-to-noise ratio through perceptual coding methods such as JPEG; that arbitrary resampling might have been done through scaling; and that cropping is a possibility. Most commercial systems also presuppose that a test image presented to the decoder has not been rotated with respect to the host image; often such systems require the test image to be untranslated as well. Furthermore, it is often assumed that the test image will be in a similar color/luminance space— RGB v. CMYK, for example—as the original host image.

By contrast, data hiding for detecting counterfeiting of security documents is constrained by an almost complementary set of circumstances. An offender is motivated to create a reproduction that looks as much as possible like a legitimate document before trying to pass it. Thus the quality of the reproduced image that would serve as a test image is usually excellent, and the size and scale of the reproduction is fixed.

SUMMARY OF THE INVENTION

Summary of the Invention

The invention provides a technique for embedding a tracking number as a series of bits in a host image in a manner executable by a printing system, including printing systems that operate by processing image data in subsegments corresponding to less than the entire image, such as an ink-jet printer. (Note that as used herein, the term "pass" refers to the movement of the print head involved in printing one continuous band or region of the image, or a fraction thereof, across the image, even if the print head technically makes more than one traverse over this area, such as may occur with some interleaving techniques.) The tracking number is detected and identified by exploiting the behavior of sums of a large number of random variables, based on the approach outlined in U.S. Pat. No. 5,689,587, herein incorporated by reference.

Specifically, the data-embedding technique alters characteristic parameter values at a set of pseudo-random locations in the host image chosen for each bit in a manner that markedly changes the expectation value of some linear combination of mathematical functions of the values at that set of locations. Each bit in the embedded string is recoverable from a test image by calculating an experimental value of a linear combination of a large number of instances of the functions and comparing the experimental value with the expectation value of the sum for the unaltered host image.

Regions are preferably defined in the image that each serve as the embedding zone for one bit; or, several bits may be embedded in each zone, due to the orthogonality of bits embedded using this technique. In general, different types of zones are defined, each type receiving a distinct data content. The dimensions of the zones are preferably large enough to accommodate the alterations to the image without degrading the image but small enough so that at least one of each type of zone will fall entirely on the host image regardless of the position of the grid defining the zones over the image. Such placement considerations can be resolved by Nyquist theory, as is well known in the art. Repeating a zone type in the image allows the decoder to identify the bits encoded therein with greater certainty.

For each bit, the embedding is done by first randomly selecting a set of locations in one of the embedding zones, for example by associating locations in the zone with members of a series of pseudo-random numbers. The locations in each set are partitioned in the general case into first and second groups. To encode one bit value, the host image is then altered by increasing the values of a characteristic parameter at locations belonging to the first group and decreasing the values of the same characteristic parameter at locations belonging to the second group; to encode the other bit value, the first group parameter values are decreased and the second group parameter values are increased. The increment by which the parameter value at any location in the subset is altered may be adapted to minimize the visibility of the encoding; for example, alteration at some locations may be waived, effectively receiving an encoding depth of zero. For digitally encoded images, the locations correspond to patches (i. e., groupings) of adjacent pixels. These changes are executed by a printing system so as to embed a bit string identifying the source of the printed document. In a preferred embodiment, the encoding operations are performed by the printer itself. In another preferred embodiment, a single pass of the printer embeds at least one of each type of zone.

In a preferred embodiment, at least one of the bits is encoded to a greater certainty than the other bits in the string, for example, by using a larger number of locations or a greater alteration to the parameter values for encoding it. One bit alone may serve as this marker; or each zone may contain its own marker and function as a tag indicating its zone type. The higher certainty of the marker bit reduces the number of false positives for the grid position as it is varied. The remaining bits defining the tracking number may be encoded to a lower certainty, with lower visibility in the image, since decoding needs only to determine the bit value of these, not confirm their presence.

Decoding entails determining whether or not a printed document includes an embedded tracking number and then determining the bit values of the string to determine the source of the printed document. The printed document is scanned if necessary to create a digitally encoded test image. To decode, a grid defining sections corresponding to the embedding zones defined during encoding is mapped onto the test image. Then, for each of a variety of grid positions, the decoder assesses the probability that a marker bit is encoded by recreating the selection and partition of locations generated during the embedding process, for example, by supplying a key specific to the pattern to a pseudo-random number generator; applying the partition procedure; and then calculating, for at least one marker bit, an experimental value of a test statistic, formulated to reflect the alterations to the host image associated with the statistic, from the parameter values at the locations selected in the test image in connection with the marker bit. If based on the experimental test statistic value, the decoder decides that a marker bit is present and that the embedding zones have been accurately recreated, the value of each of the rest of the bits is then interpreted by calculation of a experimental test statistic value from parameter values at the appropriate set of pseudo-random locations.

Generally, the test statistic is equivalent to a linear combination of many instances of respective functions of the parameter values of locations belonging to the first and second groups. For example, since the parameter values at the first and second group locations are altered in opposite directions an appropriate function would be the difference between the sums of the parameter values over the fust and second group locations.

If the probability density functions of the parameter at all locations have finite expected value and variance and are identical and independent of the values assumed at other locations, then a test statistic equal to the sum of a large number of instances of a linear combination of the parameters assumes a Gaussian form. This property facilitates determining quantitatively whether the observed value of the test statistic indicates operation of, in the case of a marker bit, an unshifted versus a shifted probability density function or, in the case of the other bits, the shifted probability density function associated with one bit value or with the other. A Gaussian description may be appropriate even for statistics that do not conform to the restrictions just listed. Furthermore, even a nonGaussian statistic can adequately differentiate probability density finctions shifted in opposite directions. The likelihood of an observed experimental value's belonging to a density function of known expected value can be bounded using the Chebyshev inequality, for example.

The method of the invention is asymmetric in that decoding the tracking number is in general much more computationally intensive than embedding it. The embedding capability is implementable on inexpensive, widely distributed printing systems. The greater outlay in time and money needed to decode the number is not inappropriate in the pursuit of a counterfeiter.

Thus, the invention provides methods for embedding and decoding a serial number or other identifying bit string of a printing system in an image to be printed, particularly suited for discovering the source of counterfeited currency, other security documents (for example, treasury bills, stock certificates, bearer bonds) and identification documents (such as birth certificates, driver's licenses, passports, social security cards). In related aspects, the invention also provides an apparatus and printing system for embedding a serial number in an image according to the method; an apparatus for reading in a test image a serial number embedded according to the method; and an image created by embedding a serial number in a host image according to the method.

BRIEF DESCRIPTION OF THE DRAWINGS

The foregoing discussion will be understood more readily from the following detailed description of the invention, when taken in conjunction with the accompanying drawings, in which:

FIG. 1 graphically depicts the effect of encoding on the probability density function of the sum of pixel parmeter differences;

FIGS. 2A–2C schematically depict arrangements of patches across an image;

Figure 3A:
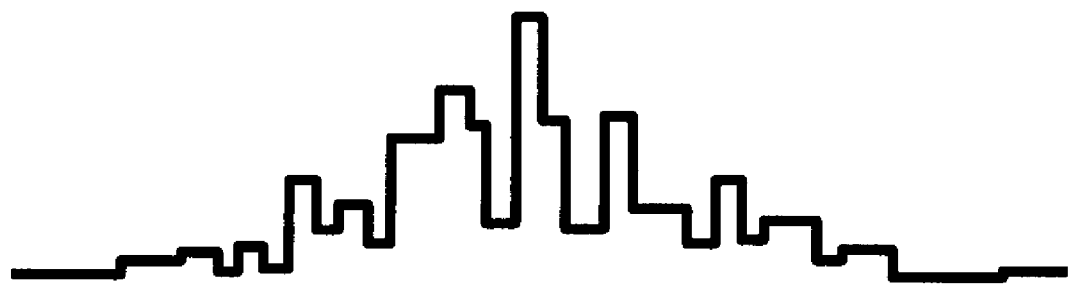
FIGS. 3A–3B graphically depict patch contours for a random cone patch.

It will be appreciated that, for purposes of illustration, these figures are not necessarily drawn to scale.

DETAILED DESCRIPTION OF AN ILLUSTRATIVE EMBODIMENT

For a pair of locations A and B, selected randomly from an image, the difference s can be defined as follows:

$$s=a-b \qquad \text{equation 1}$$

wherein a and b are equal to the values of a characteristic parameter, such as luminance or chrominance, associated with locations A and B, respectively. If a and b are random variables with identical probability density function functions, the parameter value difference s is a random variable with an expected value E(s) equal to zero with variance $\sigma_s^2$:

$$\sigma_s^2 = \sigma_a^2 + \sigma_b^2 = 2\sigma_a^2 \qquad \text{equation 2}$$

If the parameter at each location in the image conforms to a 256-level linearly quantized system starting at zero with all values equally likely, a has variance $$\sigma_a^2 = \frac{(255-0)^2}{12} \approx 5418, \qquad \text{equation 3}$$

so that the standard deviation $\sigma_s$ is about 104. This value indicates that the values of s observed experimentally for a collection of individual pairs A and B would not closely cluster about the expected value but rather would be widely spread across the possible range of s values. The nature of the uniform probability density function ("PDF") governing the luminance values limits the useful information available from any single calculation of s.

However, the Gaussian behavior of sums of large numbers of random variables enhances the utility of the information available from the aggregate of the differences of many such pairs. If a set of n samples, each sample being a pair of image locations $A_i$ and $B_i$ (i=1, 2, . . . n), having respective parameter values $a_i$ and $b_i$, are randomly selected from an image, then the sum of parameter differences $S_n$ can be defined for the set of samples:

$$S_n = \sum_{i=1}^{n}(a_i - b_i) = \sum_{i=1}^{n} s_i. \qquad \text{equation 4}$$

For parameter values $a_i^o$ and $b_i^o$, conforming to the uniform PDF described above for a, in an unaltered host image, the random variable $S'_n$ represents the sum of the differences:

$$S'_n = \sum_{i=1}^{n}(a_i^o - b_i^o). \qquad \text{equation 5}$$

The expected value of $S'_n$ is then $$E(S'_n) = n \times E(s) = n \times 0 = 0 \qquad \text{equation 6}$$

and its variance is $$\sigma_{S'_n}^2 = n \times \sigma_s^2, \qquad \text{equation 7}$$

so that the standard deviation is $$\sigma_{S'_n} = \sqrt{n} \times \sigma_s \approx \sqrt{n} \times 104 \qquad \text{equation 8}$$

Equation 8 indicates that the breadth of the probability density function of $S'_n$ about the expected value for a particular sample set grows as the square root of n, whereas the range of possible $S'_n$ values grows as n. In other words, the density function becomes more sharply peaked about the expectation value as n increases. For sufficiently large n, the PDF of $S'_n$ assumes a Gaussian envelope. Thus, about 96% of the probability density of a Gaussian distribution lies within two standard deviations of the expected value of the random variable.

The invention capitalizes on the sharpness of the $S'_n$ distribution by altering the host image so as to change the PDF underlying the sum of the parameter differences $S_n$ from that of $S'_n$ to a function that produces very different experimental values of the test statistic $S_n$ for a particular sample set associated with a specific pattern to be encoded in the host image. The presence or absence of the encoded pattern in a test image is detected by calculating an experimental value of $S_n$ for the associated sample set and interpreting its deviation from $E(S'_n) = 0$. A large deviation from zero is unlikely to occur by chance and indicates to a high degree of certainty the presence of the pattern. A doubling of the deviation indicates an even greater increase in the certainty.

Thus, in one exemplary embodiment, the tracking number is encoded by, for each bit, altering characteristic values of a zone in a host image according to the following procedure: 1) designating a sample set of pairs of randomly selected image locations $A_i$ and $B_i$ to be associated with the bit; and 2) to embed a bit of one of two possible value, increasing the parameter value $a_i$ at each location $A_i$ in the sample set from its initial value $a_i^o$ by some positive quantity $\delta_a$ and decreasing the parameter value $b_i$ at each location $B_i$ in the sample set from its initial value $b_i^o$ by some positive quantity $\delta_b$; or 3) to embed a bit of the other of the two possible values, decreasing the parameter value $a_i$ at each location $A_i$ in the sample set from its initial value $a_i^o$ by some positive quantity $\delta_a$ and increasing the parameter value $b_i$ at each location $B_i$ in the sample set from its initial value $b_i^o$ by some positive quantity $\delta_b$.

The random variable $S''_n$ represents the resulting parameter differences for each bit:

$$S''_n = \sum_{i=1}^{n}(a_i - b_i) = \qquad \text{equation 9}$$

$$\sum_{i=1}^{n}[(a_i^o + \delta_a) - (b_i^o - \delta_b)] = (\delta_a + \delta_b)n + \sum_{i=1}^{n}(a_i^o - b_i^o).$$

Because, as indicated by equation 5, the second term of equation 9 is zero, the expectation value $E(S''_n)$ for the sample set corresponding to the embedded pattern in the altered host image is $$E(S''_n) = (\delta_a + \delta_b)n \qquad \text{equation 10}$$

For each pair of locations included in the sample set, the expectation is shifted positively by $(\delta_a + \delta_b)$.

The ratio $$y = \frac{E(S''_n) - E(S'_n)}{\sigma_{S'_n}} = \frac{(\delta_a + \delta_b)n}{\sqrt{n}\,\sigma_s} \approx 0.014(\delta_a + \delta_b)\sqrt{n} \qquad \text{equation 11}$$

reveals that for a sufficiently large sample size n, the expectation value of $S''_n$ is shifted positively with respect to zero by several standard deviations of the $S'_n$ distribution 10 of the unaltered host image, as shown in FIG. 1. Therefore, for large n, there is insignificant overlap between the ranges of the $S'_n$ PDF 10 of the original host image and the $S''_n$ PDF 15 of the altered image. For a sample set embedding a bit by decreasing parameter values for the first group and increasing values for the second group, the $S'_n$ probability density function for the altered image is shifted negatively.

This segregation facilitates determining which of the two probability density functions, and thus whether the original or an altered host image, has generated a given experimental value of the test statistic $S_n$ calculated for the designated sample set. The table below shows the effect of typical parameter alterations of $\delta_a=\delta_b=\delta=2$ on $E(S''_n)$ for sample set of n pairs. If the PDF of $S'_n$ is approximately Gaussian, then the probability that an experimental value equal to $E(S''_n)$ does not belong to that PDF, i.e., the certainty of encoding, is equal to the Gaussian cumulative distribution function $\Phi(y)$.

Thus, based on the value of the test statistic compared to the expectation value of the statistic in the unaltered host image, the presence of marker bit may be confirmed and a value and a confidence level assigned. The remaining bits may then be identified using the same grid orientation and each assigned a confidence value based on the cumulative distribution function of the normalized shift in expectation value of the probability density functions introduced by the parameter value changes associated for each of the two bit values.

| sample size n | normalized shift in expectation y (equation 11) | certainty of encoding $\Phi(y)$ |
|---|---|---|
| 0 | 0 | 50.00% |
| 319 | 1 | 84.13% |
| 1276 | 2 | 97.72% |
| 2870 | 3 | 99.87% |

With assumed uniform PDF, the aggregate effect of the changes in a sample set of only a few thousand pairs, even for values of $\delta$ smaller than 5 parts out of 256, is easily detectable in a digital image. The uniform PDFs assumed for $a_i°$ and $b_i°$ in the foregoing analysis represent only one possibility for host image distribution. In currency, for example, all luminance values are not equally likely. United States currency in particular, has many white and black regions with few mid-tone regions. The variance of $S_n$ in a U.S. dollar bill was estimated from 10,000 calculations, each using 10,000 patch pairings and a 3×3 decoding area around a central pixel, of to be 77,621. The variance of $S_n$ in a U.K. five-pound note was estimated to be 79,105 using the same technique. Allowing for the consideration of nine times as many points from the 3×3 decoding area, these documents have a variance about 60% higher than the assumption of uniform variance would suggest. Such documents could be encoded with the same effect as in the example above simply by increasing the patch depth by 60%.

The marker bit is preferably encoded to a certainty of 99.999% or greater, so that fewer than one false positive is returned on average for every 100,000 images or orientations examined. If this marking bit is detected, it is known that the image contains other bits in the particular orientation being tested. A gradient search can then be done to refine the alignment of the grid with the original embedding zones. The rest of the bits defining the tracking number can then be encoded to a much lower certainty, for example as low as 99%, even as low as 50%. Smaller n and $\delta$, for example, effect this lighter encoding. Error correction coding, as is well known in the art, can be used for these bits to increase the accuracy of decoding.

In general, large values of $\delta$ promote ready interpretation of the experimental value through high confidence levels, but the range of practical values is limited by the considerations of visibility of the alterations to the host image. In this respect, the present is invention is especially amenable to invisibly embedding a signature in a color image. The relative insensitivity of the eye to luminance value in color images allows the use of luminance changes of large $\delta$ without displaying the encoding. A larger amplitude can be applied to an image using a visibility mask, that selectively suppresses alteration of any pixel that would make the encoding noticeable, without adversely affecting the image than to one in which the image is altered according to the encoding scheme regardless of its visible effect on the printed image.

In order to determine whether or not the pattern has been embedded, knowledge of the sample set for each bit, including which of the selected locations were designated $A_i$ and which were designated $B_i$, is presumed. A convenient way of preserving this information is to first generate the pairings using a key for a known pseudo-random number generator, for example by designating alternate numbers in the pseudo-random number series $A_i$ and $B_i$. Since calculation of the test statistic does not actually require pairing the locations, another possibility is to designate the first n numbers in the series as $A_i$ and the second n numbers as $B_i$. Knowledge of the key then enables recreation of the pairings for calculation of the experimental value of $S_n$.

A statistic may be embedded using grouping schemes other than the pairings illustrated above. For example, the randomly generated locations may be partitioned into three groups, including n locations in each of two of the groups and 2n locations in the third group, so that each sample comprises locations $A_i$, $B_i$, $C_{2i-1}$ and $C_{2i}$. If the encoding increases the parameter value at each $A_i$ and $B_i$ and decreases the parameter value at each $C_{2i-1}$ and $C_{2i}$, then an experimental value of the statistic $$S_n = \sum_{i=1}^{n} (a_i + b_i - c_{2i-1} - c_{2i}) \qquad \text{equation 12}$$

will indicate whether or not the test image has been encoded. For the unaltered host image, $$S'_n = \sum_{i=1}^{n} (a_i° + b_i° - c_{2i-1}° - c_{2i}°)$$

has expected value $E(S'_n)=0$, and the expected value is shifted positively by $(\delta_a+\delta_b+2\delta_c)$ for every sample in the set.

It is not necessary that the probability distribution function of $S'_n$ be zerocentric, as long as its expected value is known. For example, for the three-way grouping just presented, if encoding instead increases the parameter value at each $A_i$ and decreases the parameter value at each $B_i$, $C_{2i-1}$ and $C_{2i}$, then the statistic of interest is $$S_n = \sum_{i=1}^{n} (a_i - b_i - c_{2i-1} - c_{2i}). \qquad \text{equation 13}$$

The corresponding sum $$S'_n = \sum_{i=1}^{n} (a_i° - b_i° - c_{2i-1}° - c_{2i}°)$$

has expected value $$E(S'_n) = E\sum_{i=1}^{n} (-c_{2i-1}° - c_{2i}°) = -2nE(c°),$$

the numerical value of which depends on the probability distribution function underlying the parameter values in the host image. Each sample in the set adds $(\delta_a+\delta_b+2\delta_c)$ to the expected value. The nonzero $E(S'_n)$ does not at all hinder calculation of the normalized shift of equation 11 or of the cumulative distribution function to estimate the certainty of encoding.

This three-way grouping described by equation 13 could also be represented in terms of a two-group framework. An alpha group includes all of the locations at which parameter values are to be increased, namely the A locations, with $\alpha_j=a_j$. A beta group includes all of the locations at which parameter values are to be decreased, namely the B and C locations, with $\beta_k=b_i$ for k=1 to n; $\beta_k=c_{2i-1}$ for k=n+1 to 2n; and $\beta_k=c_{2i}$ for k=2n+1 to 3n. A test statistic equivalent to the one of equation 13 is $$S = \sum_{j=1}^{J} f(\alpha_j, j) - \sum_{k=1}^{K} g(\beta_k, k) \quad \text{equation 14}$$

with $f(\alpha_j, j)=\alpha_j$ and $g(\beta_k,k)=\beta_k$. In this case, J=n and K=3n. In terms of formulating a test statistic, the only meaningful distinction among points is the direction in which coding adjusts their parameter value. In this regard, the fact that the beta group includes points altered by two distinct values of $\delta$ is irrelevant.

The generalization of the technique can be summarized within a two-group framework as follows. The randomly chosen locations are divided into alpha and beta groups having respective parameter values $\alpha_j$ and $\beta_k$ which are respectively increased and decreased by encoding. It is not necessary that the sample set be decomposed into n distinct samples, of which each includes representatives from each group. Therefore, the numbers of locations belonging to the alpha and beta groups, J and K, may be unequal. Either of these groups may optionally encompass an arbitrary number of subgroups, each having its parameter values altered by a different magnitude by the encoding; and any subgroup may contain a number of locations different from the number contained by any other subgroup. The indicative experimental value S is equivalent to a linear combination of several instances of two arbitrary functions $f(\alpha_j, j)$ and $g(\beta_k, k)$, which are not necessarily linear functions. It must be emphasized that although the functions $f(\alpha_j, j)$ and $g(\beta_k, k)$ for the examples already given have been the identity function, this is not at all necessary. For example, an equally useful, though nonequivalent, formulation of the test statistic of equation 14 could include $g(\beta_k, k)=3\beta_k$.

In a digitally represented image, the locations at which the parameter values are adjusted correspond to patches, each a region in the image including several pixels, rather than to ungrouped individual pixels. (In analog images, the distinction between points and patches is arbitrary.) In general, this approach shifts the noise introduced by the encoding into lower spatial frequencies. More specifically, by design of the patch contour, (i. e., the variation of $\delta$ over the patch area), the patchwise embodiment allows targeting of a particular range of spatial frequencies to contain the embedded data. The lower-frequency nature of patchwise encoding accommodates higher values of $\delta$ without displaying the encoding. Spreading each parameter alteration over several pixels also makes the encoding less vulnerable to destruction by rotation and translation. This approach provides more information for the decoder to exploit, for example by examining a 3×3 block of pixels around the patch-identifying pixel.

Typically, the patch size scales with the dimensions of the image, but other considerations also influence the optimum patch size. The patch dimension used for encoding should be greater than a minimum size determined by the loss in resolution typically introduced by the printing and scanning devices. Also, deliberate rotation or translation before printing or inadvertent misalignment of the document during scanning introduces error into the registration of the zone boundaries and pixel coordinates defined on the test image with those defined on the host image during encoding. This is compensated for during decoding by the grid search. However, larger patch sizes reduce the number of orientations and positions that must be searched. For these reasons, the patch size is preferably no smaller than on the order of 1/10" for use with a print/scan system comprising a 720×720 DPI color ink-jet printer and a 300 DPI flatbed scanner.

In one approach, the patches are selected from cells defined by a lattice mapped onto the image so as to assign each pixel of the image to a cell. Then the groupings used to specify the encoded pattern designate cells, of which the parameter values of the member pixels are altered. In decoding, the parameter value at an arbitrarily chosen position, such as the centroid of the patch, can be used to represent the patch in the experimental value of $S_n$, since the parameter values of all of the points in the patch have been altered in the same direction.

A simple rectilinear lattice defining square cells 50, as FIG. 2A shows. As the parameter values are altered over the patches defined by such a grid, the resulting discontinuity in, e. g. luminance, is concentrated in the regions near the corresponding cell borders 52. If n is large, so that most of the cells define altered patches, this lattice symmetry promotes visibility of the encoding. The symmetry of the hexagonal grid shown in FIG. 2B makes the border regions 54 between cells 56 less obvious to the eye.

In another approach, the patches are scattered randomly across the image. If patches are constructed around points 58 randomly selected from all the points in the image, the result resembles the arrangement of patches 59 indicated by FIG. 2C. Such an arrangement minimizes the perceptible distortion introduced by encoding.

Figure 3B:
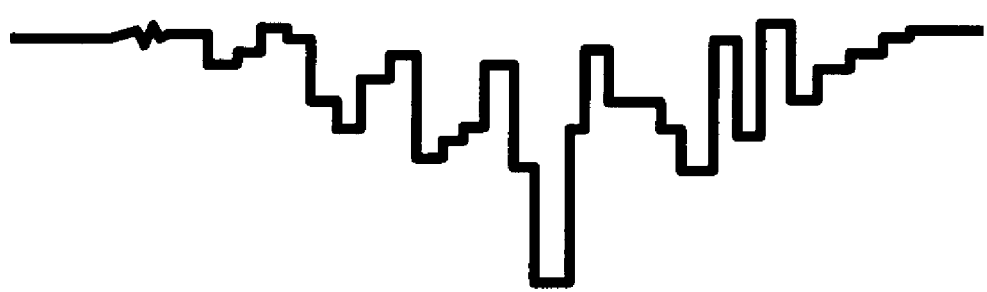

The patch depth $\delta$ need not be constant over the entire patch area. The contour of a patch (i. e., the variation of $\delta$ over the patch area) largely determines which spatial frequencies will by modified by the encoding. The ability to adjust parameter values over a multi-pixel area allows smoother variation in patch depth around the edges of the patch. This rounding takes advantage of the lower sensitivity (about 1 part in 40) of the eye to smoothly changing luminance values compared to its sensitivity (about 1 part in 240) to discontinuous changes in a region of otherwise uniform luminance. A random mask imposed on a smooth patch contour further decreases patch visibility. For example, FIGS. 3A–3B shows $\delta$ as a function of position for random cone patch contours which increase and decrease, respectively, the parameter values of the patch pixels. This patch contour has a maximum depth at the center of the patch. Otherwise, $\delta$ is random across the patch, enveloped by a cone. The random cone contour is especially useful when a gradient search is to be done in that the sloped envelope helps pinpoint the patch center.

The use of patching imparts resistance to the encoded information against rotation and translation that is not attainable with pixel-wise parameter alteration. This principle is illustrated with respect to rotation by the two identical 4×4 rectangular grids shown in FIG. 4. The first grid 60 has been rotated about 10° clockwise with respect to a second grid 70 about their mutual center 65. The shaded regions 75 indicate the overlap between a given cell in the first lattice 60 and its analog in the second lattice 70. The overlap is substantial, and the center of every cell in the first lattice 60 falls in the corresponding cell in the second lattice 70.

Figure 4:
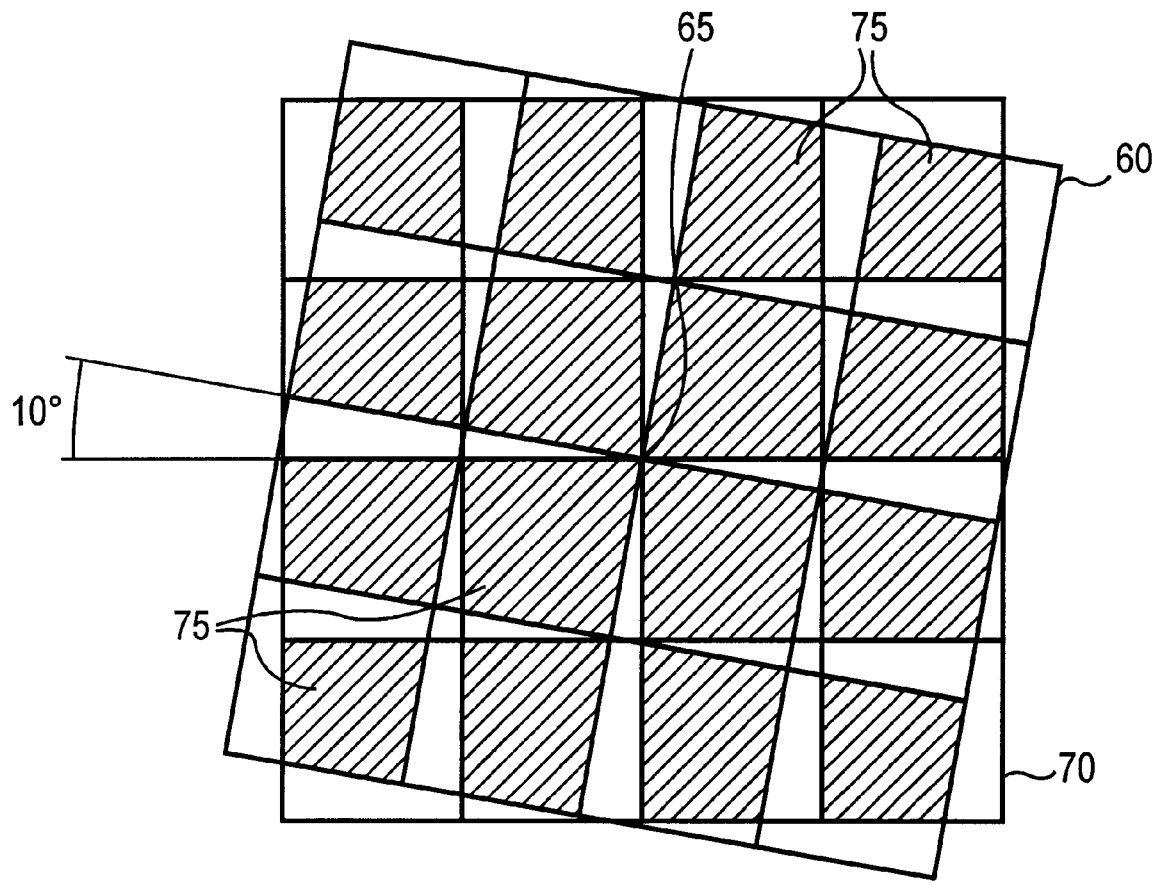
FIG. 4 illustrates the effect of rotation on the lattice mapping.

Testing the image for the embedded signature pattern first includes establishing a coordinate system against which the pseudo-random locations are identified. Rotation between the coordinate system used for encoding and that used in decoding, for patches conforming to a rectilinear grid as shown in FIG. 2A, results in the relationship between the patches in the encoded host image and those in the test image would be as shown in FIG. 4. Even if the mapping imposed does not perfectly match that used for the encoding, the overlap between the patches of the two grids would allow calculation of a meaningful test statistic.

Visibility masking is especially important in encoding printed documents because of the nonlinear modifications introduced when the image is taken out of the digital environment by printing and then rescanned, as occurs when data is embedded during printing and then scanned before detecting. Larger modifications—in terms of patch depth, patch size, or number of patches—are needed to ensure accurate decoding; the magnitude of the alterations are even greater for marker bits. For example, encoding depths from 25 to as great as over 150 parts out of 256 are appropriate for encoding U.S. currency. Without visibility masking such changes could unacceptably affect the appearance of the image.

The parameters governing the sample size and the size, shape, contour, and depth of the patches can all be determined algorithmically at encoding or decoding for a particular image, based on criteria incorporating the above-mentioned considerations.

Figure 5:
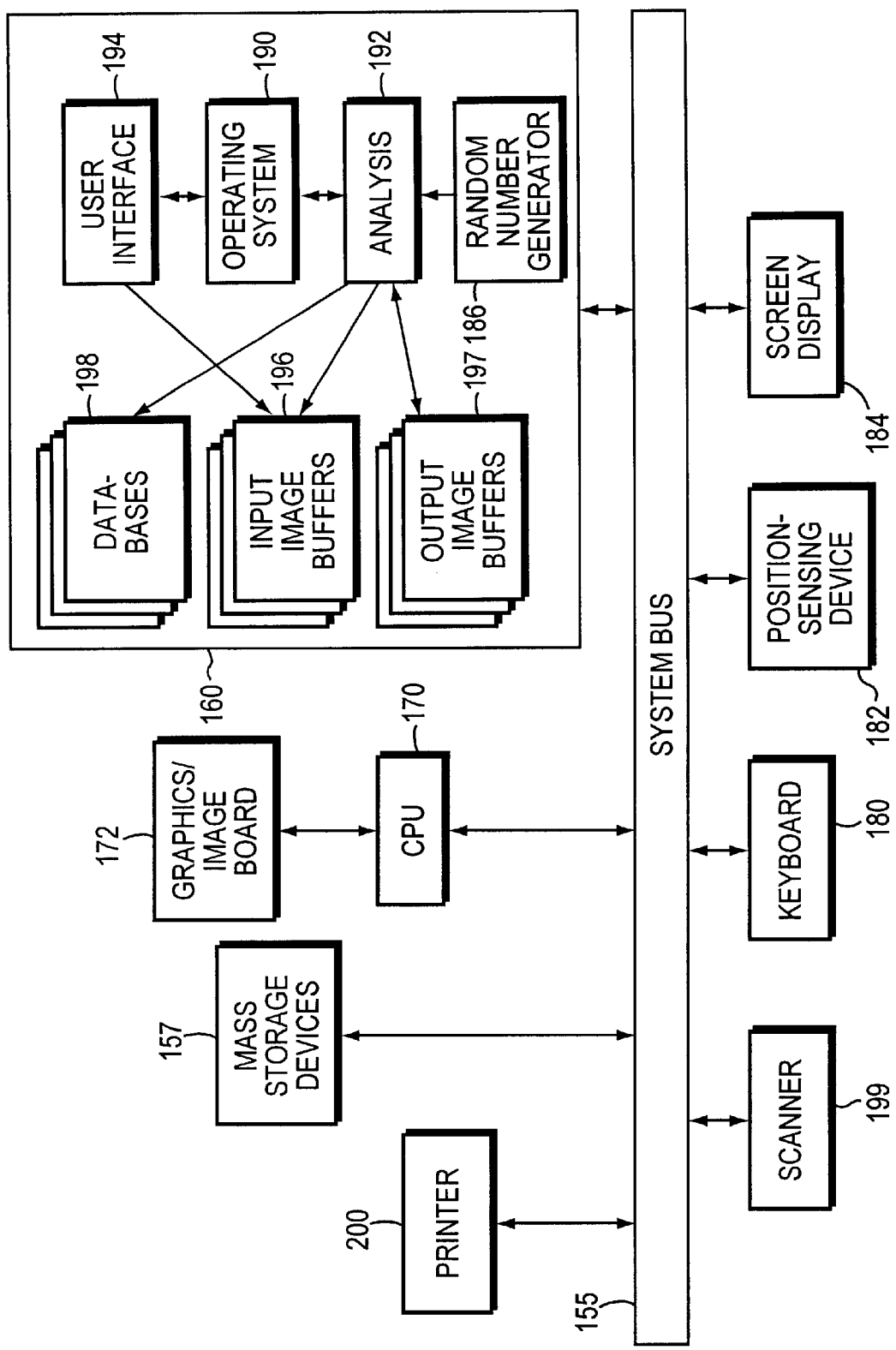
FIG. 5 schematically illustrates a representative hardware environment for the present invention.

Refer now to FIG. 5, which illustrates, in block-diagram form, a hardware system incorporating the invention. As indicated therein, the system includes a system bus 155, over which all system components communicate, a mass storage device (such as a hard disk or optical storage unit) 157 as well as a main system memory 160.

The operation of the illustrated system is directed by a central-processing unit ("CPU") 170. To facilitate rapid execution of the image-processing operations hereinafter described, the system preferably contains a graphics or image-processing board 172; this is a standard component well-known to those skilled in the art.

The user interacts with the system using a keyboard 180 and a position-sensing device (e.g., a mouse) 182. The output of either device can be used to designate information or select particular areas of a screen display 184 to direct functions to be performed by the system.

The main memory 160 contains a group of modules that control the operation of CPU 170 and its interaction with the other hardware components. An operating system 190 directs the execution of low-level, basic system functions such as memory allocation, file management and operation of mass storage devices 157. At a higher level, an analysis module 192, implemented as a series of stored instructions, directs execution of the primary functions performed by the invention, as discussed below: instructions defining a user interface 194 allow straightforward interaction over screen display 184. User interface 194 generates words or graphical images on display 184 to prompt action by the user, and accepts user commands from keyboard 180 and/or position-sensing device. A random number generator 186 creates the ordered series of pseudo-random numbers used in encoding or decoding.

The main memory 160 also includes one or more input image buffers 196 that contain image(s), such as a host or test image, used as input for processing according to the invention and output image buffers 197 that contain an output image generated by that processing. The contents of each input or output image buffer define a "raster," i.e., a regular two-dimensional pattern of discrete pixel positions that collectively represent an image and may be used to drive (e.g., by means of image-processing board 172 or an image server) screen display 184 to display that image. The values of pixel parameters, such as luminance, contained at each memory location in an image buffer 196 or 197 directly governs the appearance of a corresponding pixel on display 184.

One or more databases 198 contain encoding and/or decoding information, which may include e. g., description of the grid defining embedding zones; the bit string to be encoded; for each bit, the certainty of encoding, the output of the random number generator and the key used by it to generate the pseudo-random number series; the correspondence between numbers and locations; the rule governing assignment of patches to groups; the rule governing the assignment of numbers or patches to subsets and to the alpha and beta groups and any subgroups; the description of patches, including size, shape, arrangement and contour; the test statistic formulation, its expected value, and other details of its probability functions. One or more of the databases 198 may be associated with each one of the image buffers 196 or 197 and contain information specific to the image contained in the associated buffer; or, one database 198 may contain information generic to all images encoded or decoded by the apparatus. The databases may be stored in the mass storage device 157 in file(s) linked to file(s) containing the associated image(s).

It must be understood that although the modules of main memory 160 have been described separately, this is for clarity of presentation only; so long as the system performs all necessary functions, it is immaterial how they are distributed within the system and its programming architecture. Likewise, although conceptually organized as grids, pixelmaps need not actually be stored digitally in this fashion. Rather, for convenience of memory utilization and transmission, the raster pattern is usually encoded as an ordered array of pixels.

The host or test image may be provided in electronic or hardcopy format, in which case the image is processed by a scanner 199 before encoding or decoding. The digitized image is sent as bitstreams from the scanner 199 on the bus 155 to an image buffer 196 of the main memory 160. The source or test image may be stored in the mass storage device 157 as well as in image buffers 196. The printer 200 is controlled by the analysis module 192 to embed the tracking number in the host image.

As noted above, execution of the key tasks associated with the present invention is directed by analysis module 192, which governs the operation of CPU 170 and controls its interaction with main memory 160 in performing the steps necessary to encode a tracking number in a host image or to read a tracking number in a test image. Although the system is shown with the printer 200 distinct from the computational elements, the combination comprising a printing system, the invention encompasses encoding systems that rather incorporate any of these into a printer.

Figure 6:
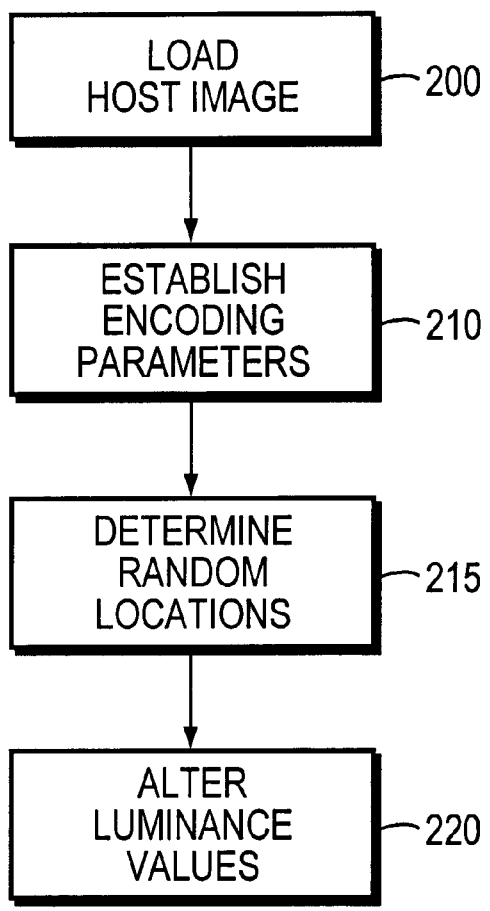
FIG. 6 is a flow chart illustrating encoding according to the invention.

In particular, the procedure followed by the hardware system for encoding a pattern in a host image is shown in FIG. 6. In a first step 200, the host image is loaded into a first one of input image buffers 196, so that it is available to analysis module 192. Then the module 192 establishes the encoding parameters in step 210. These parameters may include for example any of the information described above in connection with the database(s) 198. In response to a user command, the module 192 either retrieves these parameters, from the user interface 194 or the appropriate database 198, or determines the appropriate parameters for encoding the host image based on the considerations outlined previously herein. If appropriate for the chosen patch form, this step also includes generating a lattice defining the patches and mapping it onto the zones the host image. The values determined for the parameters, as well as the entire series of pseudo-random numbers generated in step 215, may be retained in one of the databases 198.

To encode each bit, the following sequence is followed. In step 215, the random number generator 186 provides an ordered series of pseudo-random numbers, each interpreted to correspond to a location, a pixel or lattice cell, in the host image. The analysis module 192 assigns numbers in the series to alpha and beta groups to effect the assignment of locations to groups and any subgroups as described above. In step 220, the module 192 generates an output image by altering the pixel parameter values of the locations designated by the pseudo-random numbers generated in step 215 so as to embed the desired pattern. Specifically, the analysis module 192 changes the parameter values of the pixels associated with the generated pseudo-random numbers by increasing or decreasing the values for pixels associated with numbers assigned to the alpha group and decreasing or increasing the values for pixels associated with numbers assigned to the beta group. Steps 215 and 220 are repeated for each bit. The encoded output image is then stored in second one of the output image buffers 197.

Figure 7:
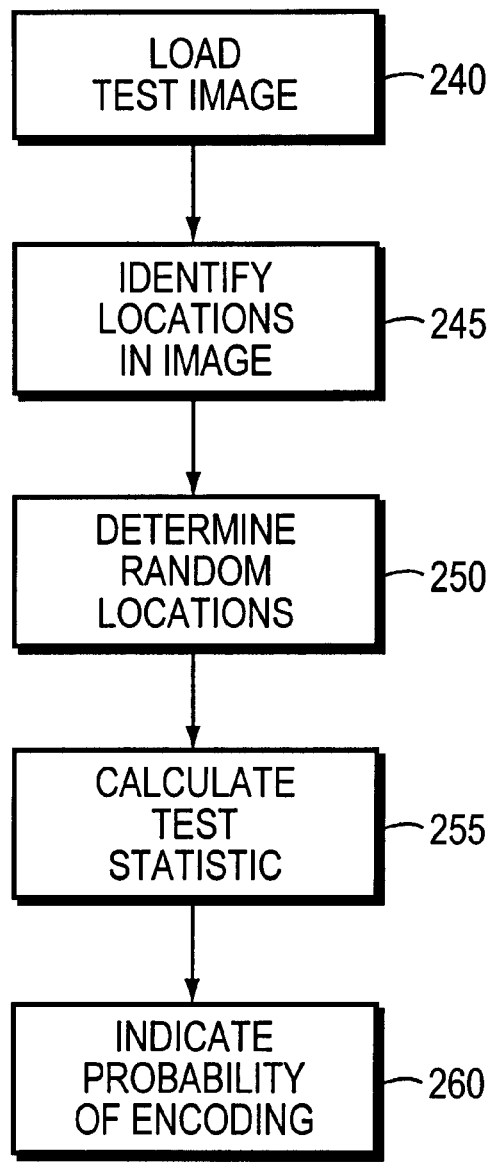
FIG. 7 is a flow chart illustrating decoding according to the invention.

As shown in FIG. 7, for decoding a particular signature in a test image, in the first step 240, the image is first loaded into one of the image buffers 162. In step 245, the module 192 performs the zone mapping and pixel mapping onto the image in a first orientation. In response to a user command, the module 192 either retrieves the information needed for this step from the user interface 194 or from one of the databases 198.

In step 250, either the analysis module 192 retrieves the pseudo-random number series and group assignment associated for at least one marker bit, or the random number generator 186 recreates it based on a key provided by the user or a database 198. In step 255, the module 192 accesses the test image stored in one of the image buffers 162 and computes the experimental value of a test statistic for at least one marker bit being decoded. In step 260, the module 192 generates an indication of the certainty to which the marker bit of interest is encoded. This indication may be showed on display 184 as the calculated experimental value or the likelihood that it belongs to the test statistic probability distribution function of the unaltered host image. Based on some predetermined criterion, the decoder either changes the test orientation and repeats the sequence of steps from 245 to 260 or maintains the established zone orientation, storing the value of the marker bit, and moves on to step 270, in which each set of locations used to encode remaining bits are examined and values assigned to the bits. The interpreted bit string is stored in a database 198.

It will therefore be seen that the foregoing represents a highly extensible and advantageous approach to embedding a tracking number in printed images. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, rather than loading the whole host image, the analysis module may treat only an area equal to less than the entire image at a time. Also, the various modules of the invention can be implemented on a general-purpose computer using appropriate software instructions, or as hardware circuits, or as mixed hardware-software combinations (wherein, for example, pixel manipulation and rendering is performed by dedicated hardware components).

What is claimed is:

1. A method of embedding information comprising a plurality of bits in a host image comprised of points, each point having a parameter value, the method comprising the steps of:
    a. defining a plurality of discrete zones within the image, each zone comprising a plurality of points;
    b. generating an ordered series of pseudo-random numbers for each bit to be embedded;
    c. assigning each pseudo-random number of each series to a first or a second group;
    d. for each series, within a single zone, associating each pseudo-random number with a point;
    e. designating each point associated with a pseudo-random number assigned to the first group to be a first point and designating each point associated with a pseudo-random number assigned to the second group to be a second point; and
    f. creating an altered host image by performing, within each zone, operations comprising:
        i. increasing the parameter value of at least some first points and of a first patch of points surrounding each of the at least some first points and
        ii. decreasing the parameter value of at least some second points and of a second patch of points surrounding each of the at least some second points, thereby embedding within the zone information comprising a bit for each series of pseudo-random numbers, such that the information embedded in all zones contains identical embedded information.

2. The method of claim 1 wherein a first of the plurality of bits, contained in a first zone, is encoded to a greater certainty than another of the plurality of bits.

3. A method of determining a proper orientation of a grid defining zones on a test image comprising a plurality of points, each point having a parameter value, for decoding a plurality of bits embedded according to the method of claim 2, the method comprising the steps of:
    a. defining a test grid having a test orientation on the test image, the grid having a respective region corresponding to the at least one zone,
    b. providing the series of pseudo-random numbers for the first bit and the assignment of each number in said series to the first or the second group;
    c. associating each pseudo-random number with a point in the region corresponding to the first zone;
    d. designating each point associated with a pseudo-random number assigned to the first group to be a first point and each point associated with a pseudo-random number assigned to the second group to be a second point;
    e. calculating the value of a test statistic, comprising the parameter values at the first and second points, formulated to reflect the first bit, the test statistic indicating whether the bit is present in the region corresponding to the first zone;
    f. changing the test orientation and repeating steps b through e at least once; and g. comparing the respective values of the test statistic generated for the respective orientations.

4. The method of decoding a bit string embedded according to claim 3, the method comprising the steps of:
   a. determining a proper orientation of a grid defining zones on a test image according to the method of claim 3; and
   b. for each bit in the string,
      i. providing the series of pseudo-random numbers and the assignment of each number in said series to the first or the second group;
      ii. associating each pseudo-random number with a point in the region corresponding to the single zone;
      iii. designating each point associated with a pseudo-random number assigned to the first group to be a first point and each point associated with a pseudo-random number assigned to the second group to be a second point;
      iv. calculating the value of a test statistic, comprising the parameter values at the first and second points, formulated to reflect the first bit, the test statistic indicating the value of the bit.

5. The method of claim 1 wherein the plurality of zones are printable by a printer in one pass, the printer requiring more than one pass to print the altered image.

6. The method of claim 5 wherein steps a through f are performed by a printer.

7. The method of claim 1 wherein steps a through f are performed by a printer.

8. The method of claim 1 further comprising the step of printing the altered host image.

9. The method of claim 1 wherein the host image constitutes a currency bill.

10. The method of claim 1 wherein the host image constitutes an identification document.

11. The method of claim 1 wherein the host image constitutes a security document.

12. The method of claim 1 wherein encoding placed in at least one of the at least one zone is repeated at a distinct location in the host image.

13. The method of claim 1 wherein the parameter value of at least one point associated with a pseudo-random number is not altered, based on expected visual perceptibility.

14. An image embedded with a bit string according to the method of claim 1.

15. A printing system for embedding information comprising a bit string in a host image comprised of points according to the method of claim 1, each point having a parameter value, the printing system comprising:
   a. a printer;
   b. a computer memory for storing at least part of the image as an ordered set of pixels, each pixel having a pixel parameter value;
   c. means for defining a plurality of zones in the host image, each zone comprising a plurality of points;
   d. means for generating an ordered series of pseudo-random numbers for each bit to be embedded;
   e. means for assigning each pseudo-random number of each series to a first or a second group;
   f. means for associating, for each series, within a single zone, each pseudo-random number with a point;
   g. means for designating each point associated with a pseudo-random number assigned to the first group to be a first point and designating each point associated with a pseudo-random number assigned to the second group to be a second point; and
   h. means for creating an altered host image by performing, within each zone, operations comprising:
      i. increasing the parameter value of at least some first points and of a first patch of points surrounding each of the at least some first points and
      ii. decreasing the parameter value of at least some second points and of a second patch of points surrounding each of the at least some second points, thereby embedding within the zone information comprising a bit for each series of pseudo-random numbers, such that the information embedded in all zones contains identical embedded information.

16. The printing system of claim 15 wherein elements b through h reside in the printer.

17. The method of claim 1 wherein the parameter values are changed by a respective amount, the amount varying based on expected visual perceptibility.

18. An apparatus for embedding information comprising a bit string in an image, the apparatus comprising:
   a. a computer memory for storing at least part of the image as an ordered set of pixels, each pixel having a pixel parameter value;
   b. means for defining a plurality of zones in the host image, each zone comprising a plurality of points;
   c. means for generating an ordered series of pseudo-random numbers for each bit to be embedded;
   d. means for assigning each pseudo-random number of each series to a first or a second group;
   e. means for associating, for each series, within a single zone, each pseudo-random number with a point;
   f. means for designating each point associated with a pseudo-random number assigned to the first group to be a first point and designating each point associated with a pseudo-random number assigned to the second group to be a second point; and
   g. means for creating an altered host image by performing, within each zone, operations comprising:
      i. increasing the parameter value of at least some first points and of a first patch of points surrounding each of the at least some first points and
      ii. decreasing the parameter value of at least some second points and of a second patch of points surrounding each of the at least some second points, thereby embedding within the zone information comprising a bit for each series of pseudo-random numbers, such that the information embedded in all zones contains identical embedded information.

* * * * *